United States Patent [19]
Harkins, Jr.

[11] Patent Number: 5,209,543
[45] Date of Patent: May 11, 1993

[54] TOP OPENING APPARATUS FOR VEHICLES

[76] Inventor: Lee L. Harkins, Jr., 903 Stuart La., Marshall, Tex. 75670

[21] Appl. No.: 863,800

[22] Filed: Apr. 6, 1992

[51] Int. Cl.[5] .............................................. B60J 7/10
[52] U.S. Cl. ................................ 296/100; 296/156; 296/26
[58] Field of Search ............... 296/100, 216, 26, 156

[56] References Cited

U.S. PATENT DOCUMENTS

| | | | |
|---|---|---|---|
| 3,508,787 | 4/1970 | Strong et al. | 296/100 |
| 3,782,776 | 1/1974 | Ormont | 296/216 |
| 3,995,890 | 12/1976 | Fletcher | 296/100 |
| 4,324,429 | 4/1982 | Wilson et al. | 296/100 |
| 4,629,243 | 12/1986 | Jenson | 296/100 |
| 4,943,108 | 7/1990 | Turnbull | 296/100 |
| 5,013,078 | 5/1991 | Eckerd et al. | 296/100 |
| 5,016,935 | 5/1991 | Semple | 296/26 |
| 5,018,777 | 5/1991 | Swenson et al. | 296/100 |

Primary Examiner—Robert R. Song
Attorney, Agent, or Firm—John M. Harrison

[57] ABSTRACT

A top opening apparatus for vehicles and vehicle enclosures such as pickup truck bed tops, which apparatus includes a pair of folding top panels longitudinally hinged to the vehicle or top for closing at a fold line which defines the top centerline of the vehicle or top. In open configuration the top panels pivot on the hinges into a substantially vertical, open configuration to facilitate loading and hauling of cargo which is taller or larger than the normal internal height of the vehicle or top. In a preferred embodiment the rear window assembly of the top opening apparatus is removable from the vehicle or top when the top panels are opened, to better facilitate loading and unloading of the cargo.

11 Claims, 3 Drawing Sheets

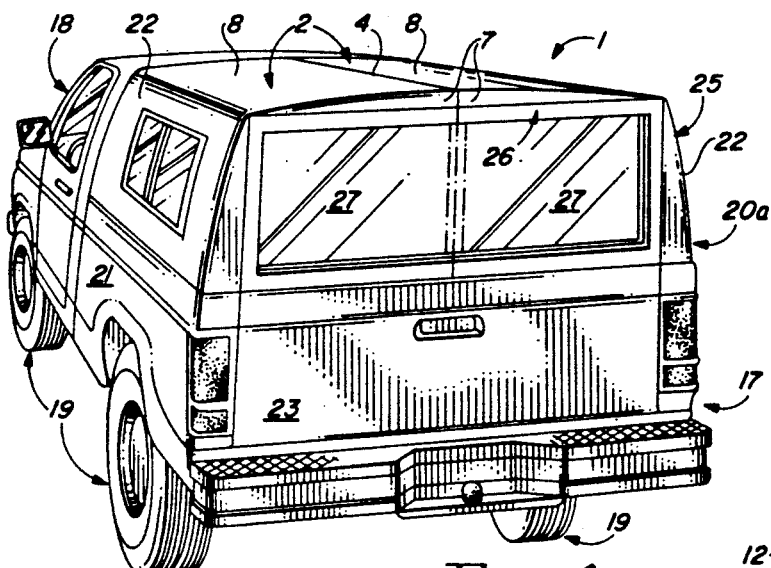
FIG-1
FIG-4
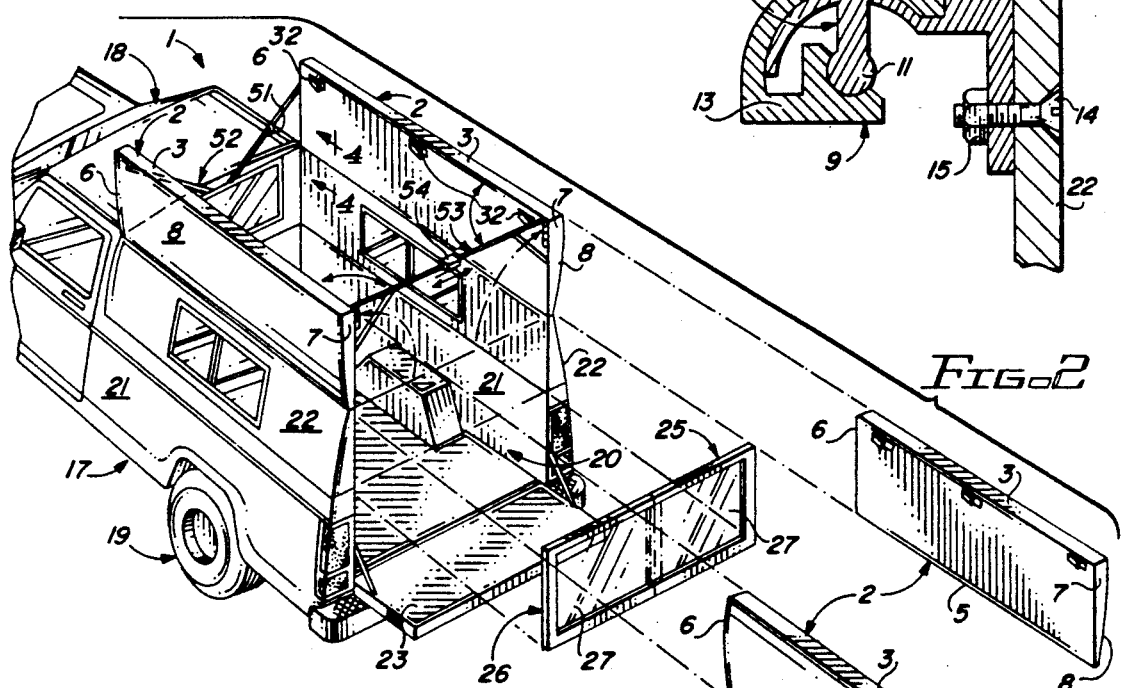
FIG-2
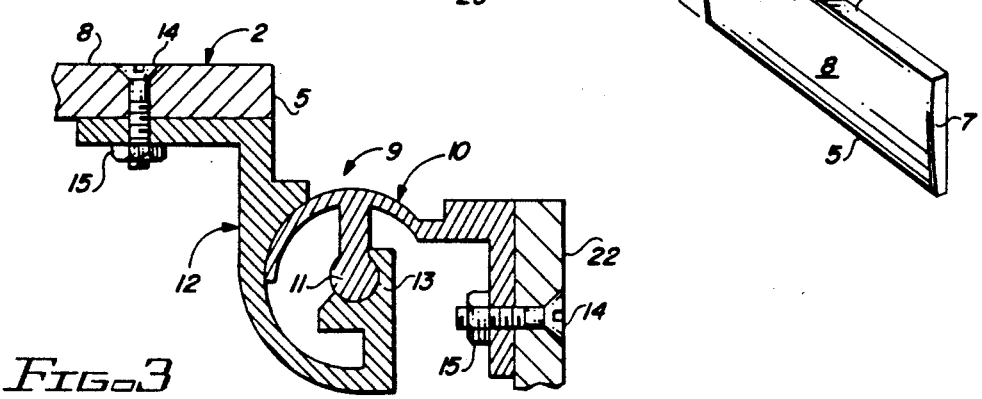
FIG-3

TOP OPENING APPARATUS FOR VEHICLES

BACKGROUND OF THE INVENTION

1. Field of the Invention

This invention relates to vehicles adapted for carrying cargo and more particularly, to a top opening apparatus for such vehicles, which apparatus includes a pair of longitudinally hinged top panels, normally closed in folded configuration at a center line to define the top of the vehicle and capable of being opened in substantially vertical orientation to receive cargo which is too tall or bulky to normally fit inside the cargo area. The top opening apparatus is capable of being mounted on substantially any vehicle having a cargo area, including tops mounted over the bed of a pickup truck, or in the roof of a van, step-side truck or like vehicle.

2. Description of the Prior Art

Heretofore, devices and methods used to cover and secure the cargo area of utility vehicles greatly restricted the height of objects which could be loaded in the vehicle for transport, and previous attempts to remedy this deficiency were inadequate, inconvenient and time-consuming to operate, or were unnecessarily complex and expensive.

U.S. Pat. No. 3,508,787, dated Apr. 28, 1970, to R. Strong, et al, details a "Convertible Closure for Pickup Truck Beds". The closure is capable of being removed from the pickup truck bed and is convertible into a boat, the bow portion of which is adapted to be contained within the closure, while the truck is in transit. The device does not allow full use of unlimited height above cargo area and is unnecessarily bulky and expensive due to boat design of the top cover. U.S. Pat. No. 3,995,890, dated Dec. 7, 1976, to Robert L. Fletcher, details a "Convertible Structure". This structure has a removable roof formed in two sections that ar pivotally secured to the sidewalls by hinge elements and to the front and rear walls by control arms, wherein the roof panels are pivotal from a closed, horizontal position to an open, vertical position disposed alongside the sidewalls. The device requires expensive linkages, control arms and fittings, and a hydraulic system. U.S. Pat. No. 4,324,429 dated Apr. 13, 1982, to Charles E. Wilson, et al, details a "Quick Detachable Hinging Cover for Pickup Truck Beds". The hinging structure is designed to mount a cover on a pickup truck bed and easy access to the bed is provided by pivoting one end of the cover upwardly away from the bed sidewalls. The device fails to provide practical access to full height above the cargo area, and is not capable of transporting a tall, upright object without fully removing and storing the cover.

A "Hinge Adaptor Kit for Open-Bed Vehicular Enclosures" is detailed in U.S. Pat. No. 4,629,243, dated Dec. 16, 1986, to John D. Jensen. The hinge adaptor kit is adapted to be secured to the sidewalls of an enclosure or cover in an open bed vehicle. The secured assemblies provide selected access to either bed side, while permitting ease of installation or removal of the enclosure therefrom. The device does not permit loading of unlimited-height objects, and use requires lifting much of the weight of the entire enclosure or cover. U.S. Pat. No. 4,943,108, dated Jul. 24, 1990, to S. Turnbull, details a "Pickup Truck Cap". The cap is designed for mounting on a pickup truck bed, the bed having a floor and a pair of sidewalls extending longitudinally on each side of the long axis of the truck. The cap defines a roof and a pair of sidewalls depending therefrom and extending longitudinally substantially coextensive therewith, the roof being split centrally longitudinally to provide substantially equal split halves. Apparatus for releasably securing the split section of the roof along the central longitudinal split line and hinges for pivoting the cap split halves to the sidewalls of the truck load bed, are also provided. In the fully open position the device protrudes to the left and right of the vehicle sufficiently to create an unsafe condition for highway use. The patent does not teach roadworthy use for transporting tall objects. U.S. Pat. No. 5,016,935 dated May 21, 1991, to James S. Semple, details a "Collapsible Cap for Pickup Truck Box". The collapsible cap has separable front, back and intermediate panel members that seal and connect along joints by releasable fasteners that may be operated by hand without the need of tools. The intermediate panel members are hinged and form side and top panel portions of the cap which are relatively pivotable, such that the top panel portions may be extended in a coplanar relationship to the side panel portions to be stored in a flattened arrangement. However, the design does not permit loading of tall objects unless the cap is removed. A "Hinge and Connection Assembly for Removable Truck Topper" is detailed in U.S. Pat. No. 5,018,777, dated May 28, 1991, to G. S. Swenson, et al. The hinge and connection assembly kit is used in combination with an open vehicle box covered by a cap or topper and provides for rotating either side of the cap in an abbreviated arc for limited access to the truck cargo area. The device does not permit loading of tall objects for transport and also presents protruding bolts inside and outside the cargo area, which presents the possibility of personnel injury while loading o unloading.

One of the problems which is inherent in the design of conventional pickup truck caps or covers, camper tops, vans, including step vans and like cargo-hauling vehicles is the limited head and cargo space available for carrying tall and/or bulky cargo items. Accordingly, tall and bulky cargo is normally carried in open top pick-up trucks, specially designed van-type trucks having extensive head room or tractor/trailer rigs, in order to accommodate the cargo height or bulk. This circumstance frequently results in additional expense to the operator, since a single tall or bulky item is frequently the only cargo which needs to be transported and the leasing or renting of a large truck or van to haul the single cargo item is sometimes cost-prohibitive.

Perhaps the most commonly used vehicle for hauling cargo, freight and the like for personal moving purposes is the pickup truck Pickup trucks are normally configured with an open bed to facilitate loading of cargo of various description and enclosing the cargo in the bed by closing the tailgate. Under circumstances where it is desired to maintain the cargo in a dry and secure condition, one-piece caps or tops have been mounted on pickup trucks for achieving this purpose. Some of these caps or tops are also useful for camping purposes and some of the more elaborate so-called "camper tops" may contain bunk beds, a stove and various other facilities commonly used for camping. Folding and collapsible caps tops and camper tops are also known in the art and these devices are frequently complex, difficult to open, close or remove from the vehicle, and have generally limited utility. A primary problem realized in utilizing such tops to receive and transport various personal items, and elongated, tall and bulky items in particular, is the limited space between the pickup truck bed and the roof of the cap top or camper top. Furthermore, the removing and re-mounting of caps or tops, including camper tops, for occasional loading of tall or bulky cargo, is time-consuming and difficult, requiring two or more people and the use of tools, and the problem of storing the camper top is well recognized.

OBJECTS AND ADVANTAGES

Accordingly, it is an object of this invention to provide a new and improved top opening apparatus for vehicles, which apparatus facilitates more rapid, safer and easier loading of elongated, bulky and tall items into the cargo area of the vehicle for transportation, thus saving time and money.

Another object of this invention is to provide a top opening apparatus for vans, trucks, and other cargo-hauling vehicles to enable hauling bulky or tall cargo without removing the tops of the vehicles.

Still another object of this invention is to provide a novel, new and improved top opening apparatus for vehicles, which provides a securable, enclosed space, as well as an open top cargo space, in a single vehicle.

Yet another object of the invention is to provide a top opening apparatus for vehicles, which apparatus allows the vehicle to meet a greater range of load and cargo demand by relatively rapid conversion from the closed to the open mode and vice-versa at any location, at any time without planning or preparation, by one person without tools and without the inconvenience of having to store the cap or top separately from the vehicle.

A still further object of this invention is to provide a top opening apparatus for vehicles, which top opening apparatus includes a pair of longitudinally hinged top panels foldable to define a center fold line and capable of being opened in substantially vertical configuration on internal or external hinges to receive tall and/or bulky items which would not otherwise fit within the cargo space of the vehicles.

Another object of this invention is to provide a top opening apparatus for pickup truck tops, which apparatus includes a pair of horizontally hinged top panels fitted with front and rear panel braces and a removable or hinged rear window system for opening the rear of the top and loading tall and/or bulky items which could not otherwise be placed in the pickup truck bed.

SUMMARY OF THE INVENTION

These and other objects of this invention are provided in a top opening apparatus for vehicles such as pickup trucks with caps, tops or camper tops, as well as trucks, vans and the like, which apparatus includes a pair of single-folding or bifolding panels longitudinally secured to the camper top, truck or van by means of external or internal hinges and foldable to close the camper or vehicle top along a centerfold line. The panels are fitted with folding struts at the front, or cab end and hinged struts at the opposite end for selectively deploying the panels in folded configuration and vertically-disposed open configuration to receive cargo. A removable rear window assembly is slidably or hingedly mounted in the rear of the top or vehicle for accessing the cargo when the panels are open.

BRIEF DESCRIPTION OF THE DRAWINGS

The invention will be better understood by reference to the accompanying drawings, wherein:

FIG. 1 is a rear perspective view of a preferred embodiment of the top opening apparatus of this invention mounted in the bed top of a pickup truck, with the top panels in folded configuration;

FIG. 2 is a rear perspective view of the top opening apparatus illustrated in FIG. 1, more particularly illustrating the top panels in open and exploded configuration;

FIG. 3 is a sectional view of an internally-mounted panel hinge commonly used in the industry, with a top panel in closed configuration;

FIG. 4 is a sectional view taken along line 4—4 of the hinge configuration illustrated in FIG. 2 with a top panel in open configuration;

DESCRIPTION OF THE PREFERRED EMBODIMENTS

Figure 5:
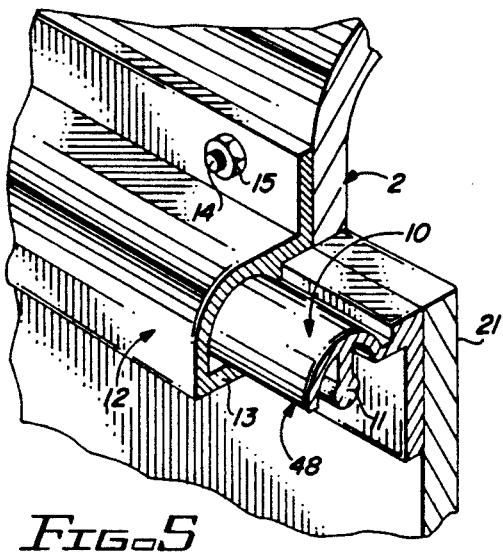
FIG. 5 is a perspective view, partially in section, of an externally-mounted panel hinge, with a top panel in closed configuration.

Referring initially to FIGS. 1-5 of the drawings, in a preferred embodiment the top opening apparatus of this invention is provided in the bed top 20a, mounted on a pickup truck 17, and is generally illustrated by reference numeral 1. The top opening apparatus 1 is characterized by a pair of top panels 2, defined by inside panel edges 3, hinged panel edges 5, front panel edges 6 and rear panel edges 7 and foldable along the fold line 4 at the inside panel edges 3, as illustrated in FIG. 1. Each of the top panels 2 includes a curved outside panel surface 8 which may be shaped to substantially the same contour as the cab 18 of the pickup truck 17, illustrated in FIGS. 1 and 2. The pickup truck 17 is conventionally characterized by a cab 18, wheels 19, a bed 20, which supports the bed top 20a, including side panels 22, and conventional internal panel hinges 9, detailed in FIGS. 3 and 4, serve to mount top panels 2 in folding configuration on the respective side panels 22 of the bed top 20a. Each of the internal panel hinges 9 further includes a vehicle hinge bracket 10, which is attached to a corresponding side panel 22 by means of panel mount bolts 14, secured by nuts 15. Similarly, the panel hinge bracket 12 element of each internal panel hinge 9 is secured to a corresponding top panel 2 by means of panel mount bolts 14, also secured by nuts 15. Hinged cooperation between the panel hinge bracket 12 and the vehicle hinge bracket 10 is effected by operation of a hinge bracket ball 11, provided in the vehicle hinge bracket 10, wherein the hinge bracket ball 11 fits in a hinge bracket socket 13 provided in the panel hinge bracket 12, as illustrated in FIGS. 3 and 4. It will be appreciated that the internal panel hinges 9 illustrated in FIGS. 3 and 4 may be reversed into an external hinge orientation as illustrated in FIG. 5, wherein the external panel hinge 48 is illustrated in closed configuration and FIG. 3 then represents the panel hinge 48 in open configuration, whereas FIG. 4 then represents the panel hinge 48 in closed configuration. These hinges are merely exemplary of the hinges which may be utilized to connect the top panels 2 to the side panels 22 of the bed top 20a, as hereinafter further described.

Figure 6:
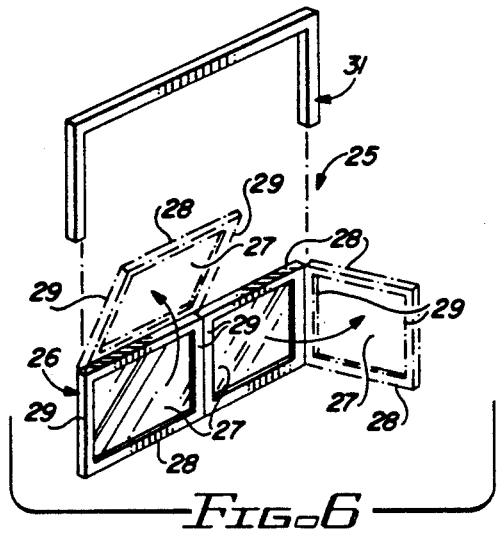
FIG. 6 is a perspective exploded view of a first preferred rear window assembly and carrying frame element of the top opening apparatus of this invention.
Figure 7:
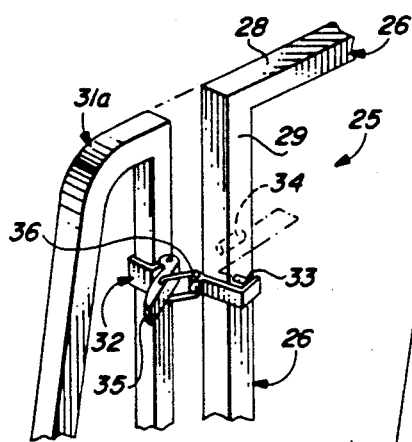
FIG. 7 is a perspective view, partially in section, of a latch mechanism for removably joining the carrying frame element to the side panel internal braces of the bed top.

Referring now to FIGS. 1, 2, 6 and 7 of the drawings, in another preferred embodiment of the invention a rear window assembly 25 closes the rear of the bed top 20a above the tailgate 23 of the pickup truck 17. The rear window assembly 25 typically includes a window assembly frame 26, defined by horizontal frame members 28 and vertical frame members 29, which carry one or more window panes 27, as illustrated in FIG. 6. Respective sets of horizontal frame members 28 and vertical frame members 29 may be fixed or hinged and removably attached to a removable carrying frame 31. When the rear window assembly 25 and the carrying frame 31 are removed, the rear of the pickup truck 17 is unobstructed for loading. In a most preferred embodiment of the invention the carrying frame 31 is removably held in place and removably attached to the side panel internal braces 31a or other frame members (not illustrated) on the bed top 20a of the pickup truck 17, to facilitate sliding removal of the window assembly frame 26, as hereinafter further described.

Figure 9:
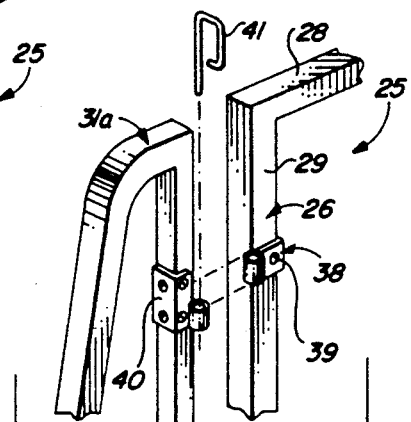
FIG. 9 is a perspective view, partially in section, of a hinge mechanism for joining the carrying frame element to the side panel internal braces of the bed top.
Figure 8:
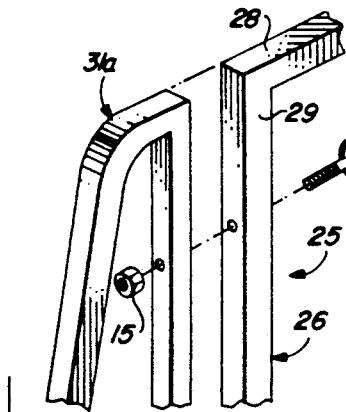
FIG. 8 is a perspective view, partially in section, of a wing bolt and nut fastening system for joining the carrying frame element to the side pane internal braces of the bed top.
Figure 10:
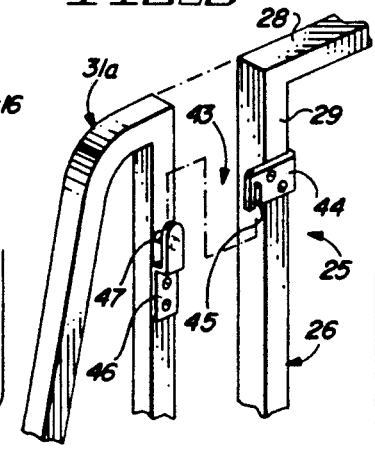
FIG. 10 is a perspective view, partially in section, of a dual bracket mechanism for joining the carrying frame element to the side panel internal braces of the bed top.
Figure 11:
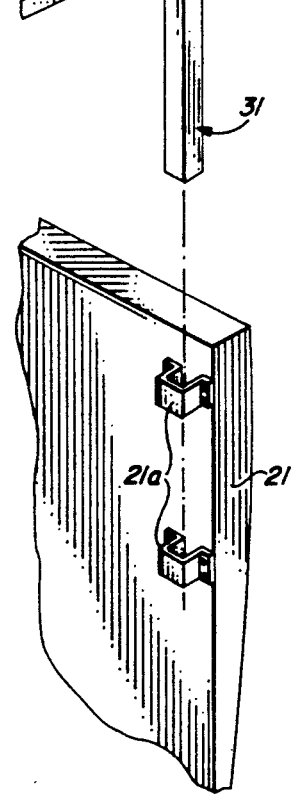
FIG. 11 is a perspective view, partially in section, of one side of a vertical bracket system for rigidly joining and bracing the top panels in the upright or open position.

Referring now to FIGS. 6-10 of the drawings, either the removable carrying frame 31 or the window assembly frame 26 itself may be secured to the side panel internal braces 31a by means of various attachment mechanisms. For example, referring to FIG. 7, a pair of assembly frame latches 32 may be secured to the side panel internal braces 31a and each includes a latch pin 33, adapted for insertion in a corresponding latch pin opening 34, provided in one of the vertical frame members 29 of the window assembly frame 26, and a latch lever 35 is connected to the latch pin 33 by means of a latch binder 36. Accordingly, manipulation of the latch lever 35 to loosen the assembly frame latch 32 and remove the latch pin 33 from registration with the latch pin opening 34 facilitates removal of the entire window assembly frame 26 from the corresponding side panel internal braces 31a to facilitate loading cargo in the bed 20 of the pickup truck 17, as illustrated in FIG. 2. As illustrated in FIG. 9 the window assembly frame 26 is attached to the corresponding side panel internal brace 31a by means of assembly frame side hinges 38, which include vertical frame side elements 39, attached to the corresponding vertical frame member 29 and a pair of internal brace side elements 40, attached to the sides of the side panel internal brace 31a. The vertical frame side elements 39 and internal brace side elements 40 are connected in conventional fashion by a hinge pin 41 to facilitate sliding removal of the window assembly frame 26 in the manner described above. Referring to FIG. 8 of the drawings, the vertical frame member 29 of the window assembly frame 26 is attached to the corresponding side panel internal brace 31a at four points by wing bolts 16 and corresponding nuts 15, as illustrated. Similarly, referring to FIG. 10 of the drawings, the vertical frame member 29 is connected to the corresponding side panel internal brace 31a by means of at least one assembly frame bracket 43 for each side, which includes a vertical frame bracket element 44, having a downwardly-extending bracket slot 45 and a corresponding internal brace bracket element 46, provided with a bracket pin 47. The bracket pin 47 is designed to engage the downwardly-extending bracket slot 45 when the vertical frame bracket element 44 is engaged with the carrying frame bracket 46. Referring to FIG. 11 of the drawings, in another preferred embodiment of the invention the carrying frame 31 itself is removably mounted in a pair of frame panel brackets 21a, bolted or otherwise attached to the bed panels 21, respectively, to facilitate removal of the entire rear window assembly 25, including the carrying frame 31.

Figure 12:
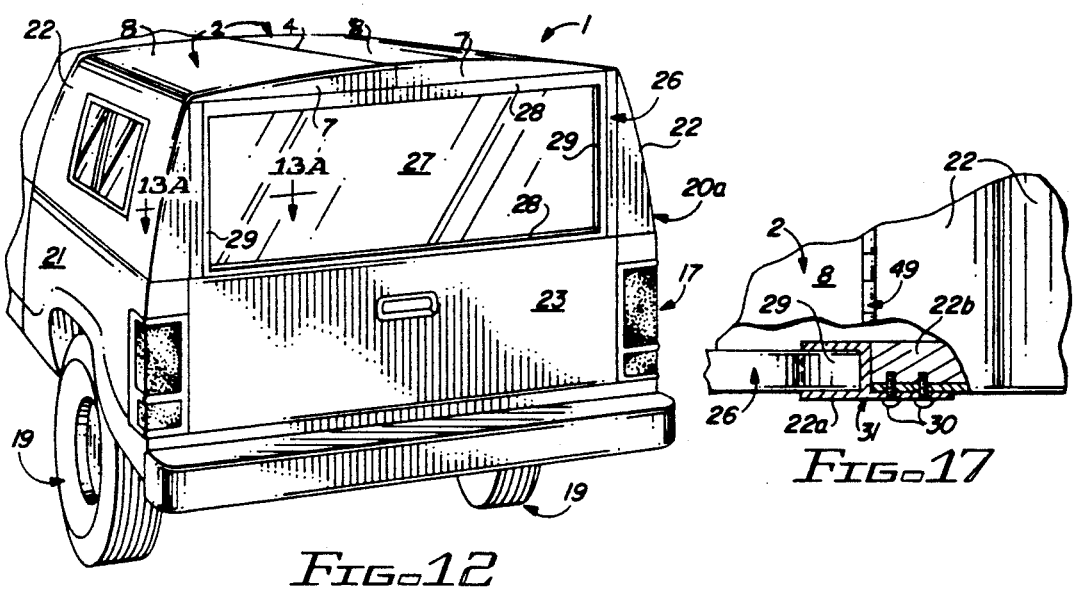
FIG. 12 is a perspective rear view of a second preferred embodiment of the rear window assembly element of the top opening apparatus mounted on the bed top.
Figures 13A, 13B:
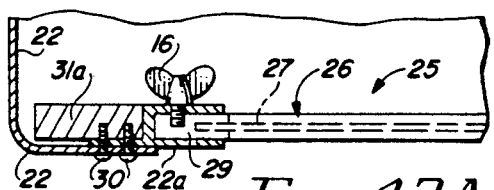
FIG. 13A is a sectional view taken along line 13A—13A in FIG. 12, more particularly illustrating a wing bolt technique for removably securing the rear window assembly in the carrying frame of the bed top.
FIG. 13B is a sectional view, also taken along line 13A—13A in FIG. 12, more particularly illustrating an alternative assembly frame latch mechanism for securing the rear window assembly in the carrying frame.
Figure 14:
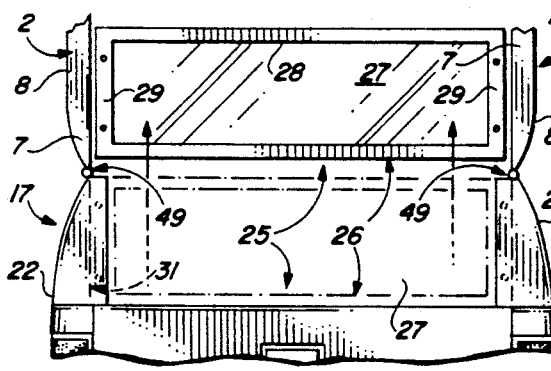
FIG. 14 is a rear view, partially in section, of the rear window assembly more particularly illustrating sliding removal of a rectangular rear window assembly from the carrying frame.

Referring now to FIGS. 12, 13A and 13B, in another preferred embodiment of the invention the window assembly frame 26 is seated in a pair of spaced, opposed window assembly brackets 22a, mounted to the side panel internal braces 31a by bracket bolts 30, as particularly illustrated in FIG. 13A. The window assembly frame 26 is maintained in slidable engagement with the window assembly brackets 22a by means of wing bolts 16, each of which is threaded into one leg of the window assembly bracket 22a, into a recess in the vertical frame members 29, as illustrated. Alternatively, referring now to FIG. 13B, the window assembly frame 26 can be removably seated in the window assembly brackets 22a by means of at least one assembly frame latch 32, the latch binder 36 of which engages a latch pin 24, projecting from one of the legs of the window assembly brackets 22a and the latch lever 35 of which is mounted on the top horizontal frame members 28 of the window assembly frame 26. Accordingly, manipulation of the assembly frame latch 32 to remove the latch binder 36 from the corresponding latch pin 24 facilitates upward-sliding of the window assembly frame 26 from the respective window assembly brackets 22a to clear the rear opening of the bed top 20a for cargo, as illustrated in FIG. 2.

Figure 17:
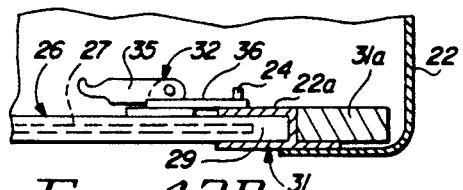
FIG. 17 is a sectional view taken along line 17—17 in FIG. 16, illustrating yet another embodiment of the rear window assembly and carrying frame.
Figure 18:
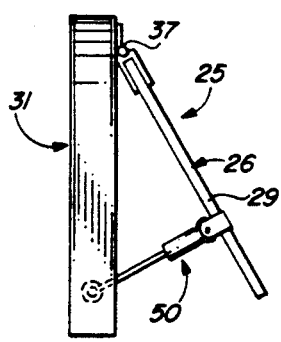
FIG. 18 is a side view of another preferred embodiment of the invention wherein the rear window is hinged in the rear window assembly for sliding into the carrying frame.

Referring now to FIGS. 12, 17 and 18 of the drawings, in an alternative preferred embodiment the window assembly frame 26 may be slidably seated in the two legs of the corresponding window assembly brackets 22a without clamping or further attachment, as desired. Accordingly, gravity maintains the window assembly frame 26 in position on a suitable rest or stop (not illustrated) spanning the side panels 22 of the bed top 20a, above the tailgate 23 of the pickup truck 17, as illustrated in FIG. 12.

Figure 16:
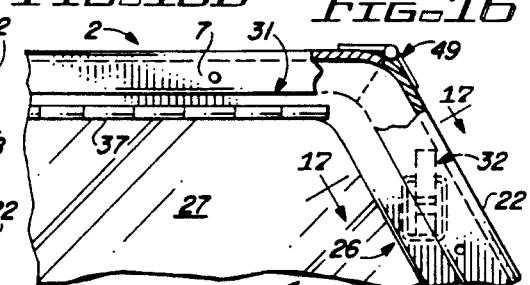
FIG. 16 is an enlarged portion of the rear window assembly and carrying frame illustrated in FIG. 15.
Figure 15:
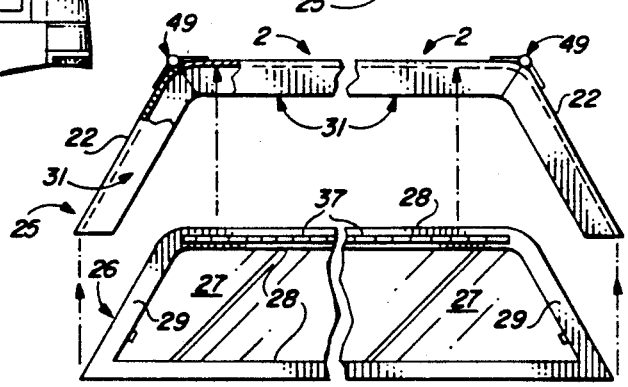
FIG. 15 is a rear view of an alternative preferred rear window assembly having an alternative configuration allowing downward sliding removal of a trapezoidal-shaped rear window assembly.

Referring to FIGS. 15 and 16 of the drawings, under circumstances where the cross-sectional configuration of the bed top 20a of the pickup truck 17 is not rectangular, but trapezoidal in configuration, the carrying frame 31 may be suitably attached to the side panels 22 and the window assembly frame 26 contoured to match the carrying frame 31. Accordingly, in another preferred embodiment of the invention the top horizontal frame member 28 of the window assembly frame 26 is fitted with an assembly frame top hinge 37 to facilitate opening and closing the lower segment of the window assembly frame 26 with respect to the carrying frame 31 by operation of the assembly frame top hinge 37. As illustrated in FIG. 16, the window assembly frame 26 may be typically secured in closed configuration against the carrying frame 31 by means of a pair of assembly frame latches 32, illustrated in phantom, to permit quick and easy accessibility and removal of the window assembly frame 26 from the carrying frame 31. Referring to FIG. 18 of the drawings, hinged extension of the lower portion of the window assembly frame 26 with respect to the carrying frame 31 on the assembly frame top hinge 37 can be effected and maintained by operation of one or more support struts 50.

Referring again to FIGS. 12, 15 and 16 of the drawings, in an alternative preferred embodiment of the invention the top panels 2 are attached to the respective side panels 22 of the bed top 20a by means of external leaf hinges 49, one element of which is attached to the corresponding top panel 2 and the opposite element to the corresponding side panel 22, as illustrated. However, it will be appreciated by those skilled in the art that alternative hinge mechanisms may be used in the top opening apparatus 1 without departing from the spirit and scope of the invention. For example, as indicated above, the internal panel hinges 9 may be reversed and placed inside the bed top 20, as illustrated in FIG. 5, to define the external panel hinges 48, as desired. Under these circumstances, the top panels 2 are more curved and are open in the embodiment illustrated in FIG. 3 and closed in the embodiment illustrated in FIG. 4.

It will be appreciated and understood from a consideration of the drawings that the top opening apparatus of this invention may be adapted to substantially any cargo-carrying vehicle, whatever the design, by simply hinging the top panels 2 to the upward-standing side panels 22, in the case of a bed top 20a, or directly to the bed panels 21 of a vehicle other than a pickup truck. Furthermore, suitable sealing techniques can be applied to the inside panel edges 3 and front panel edges 6, as well as the rear panel edges 7, according to the knowledge of those skilled in the art, to prevent water from entering the bed top 20a or vehicle at the fold line 4 or other interfaces between the top panels 2 and the side panels 22 and the rear window assembly 25.

Referring again to FIG. 2 of the drawings, in another preferred embodiment of the invention the top panels 2 may be maintained in upwardly-extended configuration by means of a front pair of folding struts 52, each having a strut hinge 51 and a corresponding pair of hinged struts 53 at the rear of the top panels 2 and fitted with sliding keeper 54. Accordingly, when the folding struts 52 are extended, the corresponding strut hinges 51 locked, the hinge struts 53 pivoted into alignment with the keeper 54 and the keeper 54 slidably extended across the abutting ends of the hinge struts 53 to join the ends thereof, the top panels 2 are extended upwardly in raised, rigidly braced, essentially vertical configuration, as illustrated in FIG. 2. Folding of the folding struts 52 at the respective strut hinges 51 and sliding of the keeper 54 onto on of the hinge struts 53 and pivoting of the hinge struts 53 inwardly against each of the top panels 2, respectively, facilitates deployment of the top panels 2 into the closed configuration illustrated in FIG. 1. The top panels 2 may be secured in closed configuration by additional inside latches 32, illustrated in FIG. 2.

CONCLUSION, RAMIFICATION AND SCOPE

While my above description contains many specificities, these should not be construed as limitations on the scope of this invention, but rather as an exemplification of several preferred embodiments thereof. Many other variations are possible. For example, a great variety of methods and hardware are available to removably secure the rear window to the rear of the vehicle and to provide for its removal by sliding, swinging, raising, dropping, or otherwise removing it for quick access to the cargo area. Likewise, numerous alternative hinge means exist in the market place such as geared extruded aluminum, vinyl and various other materials and styles, many of which are directly useable on this invention. For example, referring again to FIGS. 15 and 16, the upper segments of the carrying frame 31 can be split, fastened to the top panels 2, and caused to swing upwardly with the top panels 2, on the external leaf hinges 49, as desired. Furthermore, referring to FIG. 11, the carrying frame 31 may also serve to support the rear ends of the top panels 2 in place of the hinged struts 53. Accordingly, the scope of the invention should be determined not by the embodiments illustrated, but by the appended claims and their legal equivalents.

Having described my invention with the particularity set forth above, what is claimed is:

1. A top opening apparatus for a vehicle, comprising a pair of panel means defining the top of the vehicle in folded configuration, hinge means connecting said panel means to the vehicle in spaced, limited panel extension relationship, carrying frame means carried by the vehicle and window assembly frame means slidably and removably carried by said carrying frame means for mounting a rear window in the vehicle, whereby said panels are selectively extendible away from each other on said hinge means to a substantially vertical orientation in spaced, substantially parallel relationship.

2. The top opening apparatus of claim 1 wherein said hinge means further comprises a pair of external hinges connecting said panel means to the vehicle, respectively.

3. The top opening apparatus of claim 1 wherein said hinge means further comprises a pair of internal hinges connecting said panel means to the vehicle, respectively.

4. The top opening apparatus of claim 1 further comprising fastening means releasably connecting said window assembly frame means to said carrying frame means.

5. The top opening apparatus of claim 1 further comprising folding strut means carried by said panel means and the vehicle for supporting said panel means in said vertical orientation and deploying said panel means in said folded configuration.

6. The top opening apparatus of claim 5 wherein said folding strut means further comprises at least one pair of folding struts, each of said folding struts having a folding strut hinge for extending said folding struts when said panel means is in said vertical orientation and collapsing said folding struts when said panel means is in said folded configuration.

7. The top opening apparatus of claim 6 further comprising fastening means releasably connecting said window assembly frame means to said carrying frame means.

8. The top opening apparatus of claim 7 wherein said hinge means further comprises a pair of external hinges connecting said panel means to said vehicle, respectively.

9. The top opening apparatus of claim 7 wherein said hinge means further comprises a pair of internal hinges connecting said panel means to the vehicle, respectively.

10. A top opening apparatus for a vehicle top, comprising a pair of shaped panels defining the roof of the vehicle top in folded configuration; folding strut means carried by said panels and the vehicle top for supporting said panels in substantially vertical orientation and deploying said panels in said folded configuration; and a pair of elongated hinges connecting said panels to the vehicle top in limited panel extension relationship, each of said elongated hinges comprising a vehicle hinge bracket carried by said vehicle in fixed relationship, with a hinge bracket socket shaped in said vehicle hinge bracket and a panel hinge bracket carried by said panels, respectively, with a hinge bracket ball shaped in said panel hinge bracket for slidably engaging said hinge bracket socket, whereby said panels are selectively hingedly extendible in opposite directions on said elongated hinges to said substantially vertical orientation in spaced, substantially parallel relationship.

11. The top opening apparatus of claim 10 further comprising rear window means removably carried by the vehicle top.

* * * * *